(12) United States Patent
Rist et al.

(10) Patent No.: US 6,401,326 B1
(45) Date of Patent: Jun. 11, 2002

(54) DEVICE FOR PRODUCING COIL WINDINGS IN STATOR LAMINATED CORES

(75) Inventors: Otto Rist, Baienfurt; Anton Wessle, Mochenwangen, both of (DE)

(73) Assignee: Otto Rist, Baienfort (DE)

( * ) Notice: Subject to any disclaimer, the term of this patent is extended or adjusted under 35 U.S.C. 154(b) by 0 days.

(21) Appl. No.: 09/288,103

(22) Filed: Apr. 8, 1999

(51) Int. Cl.⁷ .................. H02K 15/00; H02K 15/14; H02K 15/16
(52) U.S. Cl. .................. 29/596; 29/732; 29/606
(58) Field of Search .................. 29/732, 564.1, 29/596, 606, 736

(56) References Cited

U.S. PATENT DOCUMENTS

| | | | |
|---|---|---|---|
| 4,416,058 A | * 11/1983 | Henry et al. | 29/596 |
| 4,477,966 A | * 10/1984 | Napierski | 29/596 |
| 4,679,312 A | 7/1987 | Nussbaumer et al. | 29/596 |
| 4,739,549 A | * 4/1988 | Rist | 29/732 |
| 4,899,433 A | * 2/1990 | Morschel et al. | 29/596 |
| 5,400,502 A | * 3/1995 | Ota et al. | 29/564.1 |
| 5,517,750 A | * 5/1996 | Eddy | 29/596 |
| 5,845,392 A | * 12/1998 | Cardini et al. | 29/596 |

FOREIGN PATENT DOCUMENTS

| | | | | |
|---|---|---|---|---|
| JP | 60-20760 | * | 2/1985 | 29/732 |
| SU | 1415-337 | * | 8/1988 | 29/732 |
| WO | WO 84/01476 | * | 4/1984 | 29/732 |

OTHER PUBLICATIONS

Statomat entitled "Präsentation technischer Neuheiten", pp. 1–11.

* cited by examiner

Primary Examiner—Peter Vo
Assistant Examiner—Rick Kiltae Chang
(74) Attorney, Agent, or Firm—Crowell & Moring LLP

(57) ABSTRACT

A device for mounting stator coils (7, 8) in stator laminated cores (6) is proposed which permits fabrication with an increased degree of automation. This is achieved according to the invention by virtue of the fact that a movable hoisting unit (1) is provided with a frame (2) and a holder (3), which can be moved relative to the frame (2), for a stator laminated core (6), the hoisting unit (1) comprising at least one processing tool (10, 12) which can be moved relative to the frame (2) and/or the holder (3).

9 Claims, 4 Drawing Sheets

DEVICE FOR PRODUCING COIL WINDINGS IN STATOR LAMINATED CORES

BACKGROUND AND SUMMARY OF THE INVENTION

To date, the coil windings in stator laminated cores have been inserted in various working steps at various processing stations, the stator laminated core being transferred from processing station to processing station. This transfer is carried out manually, and the next processing step is started thereafter.

At a first processing station, the individual coils are wound in this case into a so-called pull-in tool, which is subsequently transferred from the winding station to a pull-in station. In this case, there is placed manually on the pull-in tool thus prepared and provided with coils a cover which both fixes the individual laminations of the pull-in tool in the radial direction, and sets the exact pitch of the individual laminations along the circumference of the pull-in tool. During the subsequent operation of pulling the coils into the slots of a stator laminated core, exact positioning of the laminations and the corresponding coils in front of the respective slots of the stator laminated core is thereby ensured. Subsequently, the stator laminated core with the pulled-in coils is brought to a separate forming station where the coil ends are pressed into a desired form spread slightly outward.

It is the object of the invention to start from the previously described prior art and propose a device and a method by means of which the processing steps described can be carried out with a relatively high degree of automation.

Starting from a device and a method of the type mentioned in the introduction, this object is achieved by means of the characterizing features of claim 1.

Advantageous embodiments and developments of the invention are possible by means of the measures named in the subclaims.

Consequently, a device according to the invention for mounting coils is distinguished by a movable hoisting unit with a frame, a holder for a stator laminated core being provided which can be moved relative to the frame. The hoisting unit is, moreover, provided with at least one processing tool which can be moved relative to the frame and/or the holder. It is thereby possible for the stator laminated core fixed in the hoisting unit to be brought up to a processing station, and for a further processing tool, provided on the hoisting unit, to be brought into use on the side opposite the processing station. An automatic method cycle is rendered possible hereby.

Owing to the construction of the hoisting unit as set forth above, it is possible, in addition, for the stator laminated core to remain in the holder during said processing steps, thus permitting automatic fabrication without transfer of the stator laminated core.

The processing tool is advantageously constructed such that it can be moved along the central axis of a stator laminated core held in the holder. As a result, it is possible to process the stator laminated core from both end faces, at which the coil ends project after being pulled in. Furthermore, a tool fastened on the hoisting unit can be guided centrally through the stator laminated core and come into use at the opposite side.

Thus, in a particular embodiment a cover for fixing the pull-in needles of a pull-in tool is provided as processing tool. As previously described, this cover can be guided through the stator laminated core and be placed on the pull-in laminations of a pull-in tool before the stator coils are pulled in. The result, as so far in the case of manually placing such a cover, is to fix the pull-in needles both in the radial direction and in relation to their uniform pitch along their circumference. Subsequently, the stator laminated core can be pushed onto the pull-in tool by moving the movable holder and/or the pull-in tool, the stator coils being pulled into the corresponding slots. The holder of the stator laminated core hereby applies on the stator laminated core the counterforce required for inserting the pull-in tool, with the result that it is possible to eliminate a separate clamping, the so-called stator clamping, customary to date.

In a development of the invention, a former is provided as processing tool. Using such a former, the stator laminated core can be processed at the end face after the stator coils have been pulled in. In this case, the stator laminated core is preferably simultaneously brought up to a forming station which has a former for acting on the pull-in side of the stator laminated core. The former arranged on the hoisting unit can therefore be used simultaneously to form the opposite side of the stator laminated core situated opposite the pull-in side.

In a particularly advantageous embodiment of the invention, the hoisting unit is equipped with a hoisting gripping device as holder for the stator laminated core. A hoisting gripping device can be used to grip a stator laminated core reliably from two sides and to hold it exactly in position.

The holder, particularly in the form of a hoisting gripping device, is preferably constructed such that it can be swiveled in at least one spatial direction. As a result, for example the hoisting gripping device, can be used as fixing element for the stator laminated core in further processing steps going beyond said processing stages. Such processing steps can be provided manually or, equally, in an automated fashion. The stator laminated core can be swiveled in the hoisting unit into the position respectively most favorable for processing.

In a particular embodiment of the invention, the hoisting unit is constructed such that it can be moved between a loading station, a pull-in station and/or a forming station. As a result, it is rendered possible in the way set forth above for the stator laminated core to be picked up automatically, followed by the pulling in of the stator coils and the subsequent formation of the coil ends without transferring the stator laminated core to the respective processing stations.

In a development of the invention, at least one additional hoisting unit with a further processing tool is provided. By means of a further hoisting unit, it is possible for further processing tools which, for design reasons, can no longer be accommodated on the first hoisting unit to be brought into use in the same way as the processing tools provided on the first hoisting unit and described above. For this purpose, the stator laminated core must be transferred from the first hoisting unit to the next hoisting unit, a transfer station preferably being set up for this. The stator laminated core can be set down in a defined position in this transfer station and be picked up again correspondingly by the next hoisting unit without any problem.

It is therefore possible, for example, to fit the cover for fixing the pull-in needles of the pull-in tool and an intermediate forming element on the first hoisting unit, and to provide a former for final forming on the second hoisting unit.

Such intermediate forming can be necessary when different coils or coil groups are to be pulled into the stator laminated core in successive pull-in operations. The coil ends then need to be formed in intermediate forming such that the pulling in of the next coil or coil group can take place without disturbance from the coils or coil groups already pulled in.

A hoisting unit as described above can, for example, be constructed such that the travel paths both of the stator laminated core fixed in the holder, in particular the hoisting gripping device, and of said processing tools run essentially in the vertical direction. Said processing stations, for example the forming station and the pull-in station, are arranged in this case such that the processing of the stator laminated core takes place after being lowered to the respective tool, for example to a pull-in tool or to a lower former.

Pneumatic or hydraulic cylinders, electric spindle drives or other drive systems customary in mechanical engineering can be used as drive for moving the holder in the hoisting unit and for moving a processing tool.

Other objects, advantages and novel features of the present invention will become apparent from the following detailed description of the invention when considered in conjunction with the accompanying drawings.

BRIEF DESCRIPTION OF THE DRAWINGS

An exemplary embodiment of the invention is represented in the drawing and explained in more detail below with the aid of the figures, in which.

DETAILED DESCRIPTION OF THE PREFERRED EMBODIMENT

Figure 1:
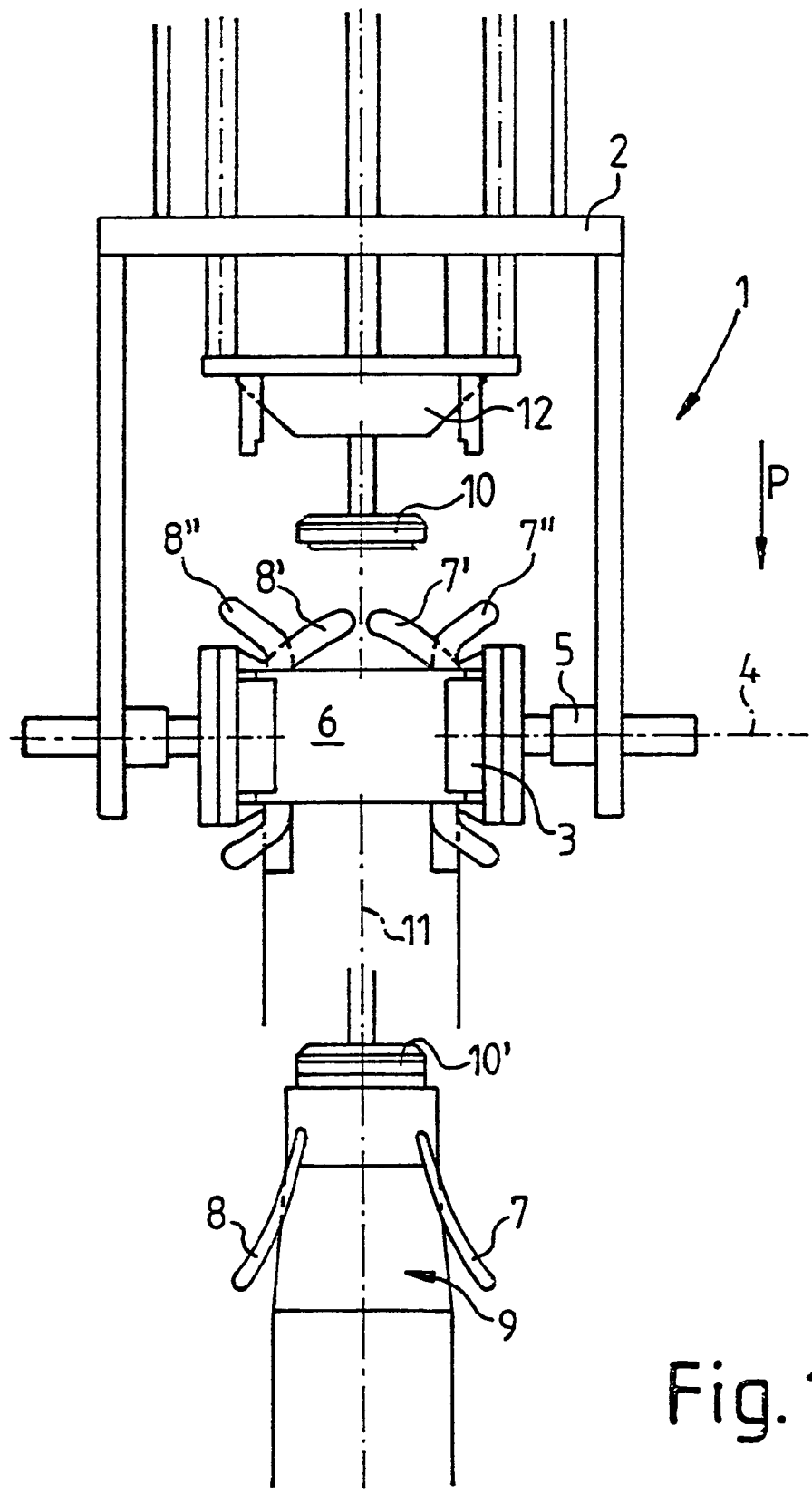
FIG. 1 shows a diagrammatic representation of a hoisting unit at a pull-in station.

In the representation in accordance with FIG. 1, a hoisting unit 1 is drawn with a frame 2 which can be moved in a way not shown in more detail. A hoisting gripping device 3 is mounted on the frame 2 such that it can swivel about an essentially horizontal swiveling axis 4. The hoisting gripping device can be opened or closed in a direction parallel to the swiveling axis 4, for example by means of cylinder units.

A stator laminated core 6 is fixed in the hoisting gripping device 3. Two stator coils 7, 8 are located inserted in pull-in laminations (not represented in more detail) of a pull-in tool 9 below the stator laminated core 6. A cover 10 is fitted on the frame 2 of the hoisting unit 1 such that it can be moved along the axis 11 of the stator laminated core 6 clamped into the hoisting gripping device 3. Thus, said cover can be placed downward in the direction of the arrow P through the stator laminated core 6 onto the pull-in tool 9. The mounted position is denoted by the reference numeral 10'. In this position of the cover 10, the pull-in needles of the pull-in tool 9 are fixed in the radial direction and in relation to their uniform pitch along the circumference.

The hoisting unit 1 can likewise be lowered in the direction of the arrow P, with the result that the stator laminated core 6 can be placed onto the pull-in tool 9. The stator coils 7, 8 are subsequently pulled into the slots (not represented in more detail) of the stator laminated core 6, it being the case, for example, that the pull-in tool 9 is pressed in a known way from below into the stator laminated core. In this case, the hoisting gripping device 3 generates the required counterforce, as a result of which a so-called separate stator clamping can be eliminated.

While the coils are being pulled in, the cover simultaneously placed onto the pull-in tool 9 is brought back through the stator laminated core 6 onto the top side, that is to say the opposite side of the stator laminated core.

After the cover 10 has been pulled back and the hoisting unit 1 has been raised, the stator coils 7, 8 are located in the non-formed position, as represented y 7' and 8', respectively.

A top intermediate former 12 of an essentially conical shape serves the purpose of bringing the stator coils 7, 8 into the intermediately formed position 7", 8". As explained in more detail further below, the hoisting unit 1 is moved for this purpose over an intermediate forming station and the stator laminated core 6 is plugged onto an intermediate forming mandrel 13. In this case, the upper ends, which are inclined in the direction of the axis 11 in accordance with the unformed position 7', 8', are pressed so far outward that the intermediate former 12 can act from above and brings about the desired intermediate form 7", 8".

The purpose of the outwardly curved coil ends 7", 8" in the intermediate forming becomes immediately clear with the aid of FIG. 1, since it is necessary in a next pull-in step for further coils or coil groups to be pulled into the stator laminated core from below, for which purpose the stator laminated core must be placed once again onto the pull-in tool 9. The cover 10 must also in this case be guided again from above through the stator laminated core 6. The result of the intermediate forming of the two end-face winding overhangs of the stator coils 7", 8" into the outwardly curved form is to clear the way both for the cover 10 and for the pull-in tool 9.

Figure 2:
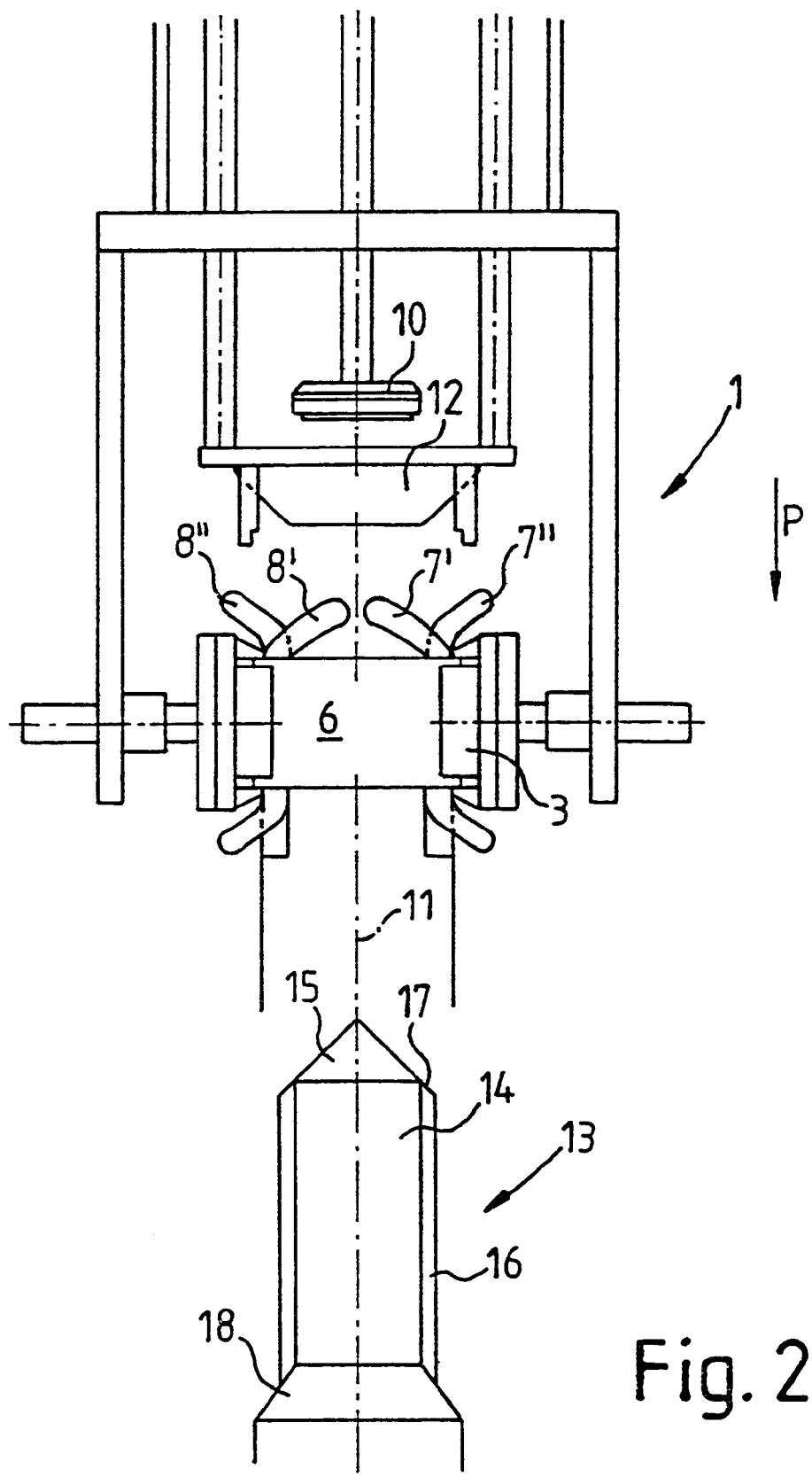
FIG. 2 shows a diagrammatic representation of a hoisting unit at an intermediate forming station.

The process of intermediate forming is illustrated, in particular, with the aid of FIG. 2. The hoisting unit 1 is moved for this purpose over the lower intermediate forming mandrel 13. The forming mandrel 13 has a cylindrical surface 14 with a tip 15. Fitted radially on the intermediate forming mandrel 13 are laminations 16 with an upper forming bevel 17. The laminations 16 are dimensioned such that they can be inserted into empty slots, not yet provided with stator coils 7, 8, of the stator laminated core 6. This takes place when the hoisting gripping device 3 is lowered (arrow P). In this process, the coil ends of the non-preformed stator coils 7', 8' are pressed outward over the tip 15 and the forming bevels 17. The intermediately formed shape 7" or 8" is subsequently produced on the lower forming cone 18 and by lowering the upper intermediate former 12, which forms an upper forming cone. The relative position of the upper intermediate former 12 with respect to the cover 10 shows that the intermediate former 12 is of annular design, with the result that the cover 10 can be moved along the axis 11 not only between the stator laminated core 6 but also through the intermediate former 12.

Figure 3:
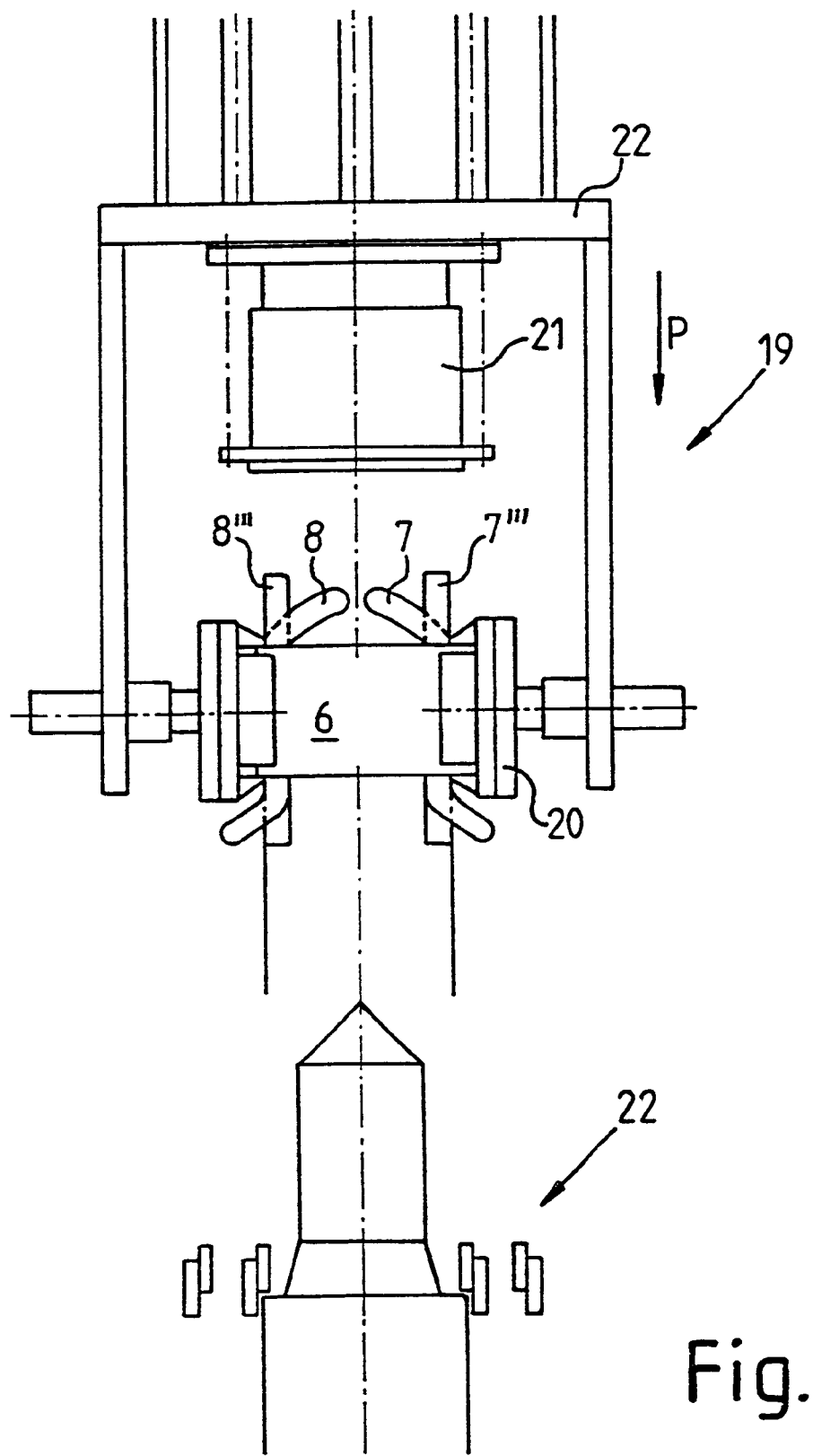
FIG. 3 shows a diagrammatic representation of a further hoisting unit at a final forming station.

FIG. 3 shows the stator laminated core 6 in a further hoisting unit 19 onto which the stator laminated core 6 has meanwhile been transferred. It is located in a hoisting gripping device 20 whose construction and swivelability correspond to those of the hoisting gripping device 3. In the hoisting unit 19, an upper final former 21 is fitted movably in turn as processing tool on the frame 22 of the hoisting unit 19. The hoisting unit 19 is arranged above a lower final former 22. The final forming of the coils 7, 8 into the finally formed position 7'", 8'" takes place by lowering the stator laminated core 6 onto the final former 22 and subsequently pressing on the upper final former 22.

Figure 4:
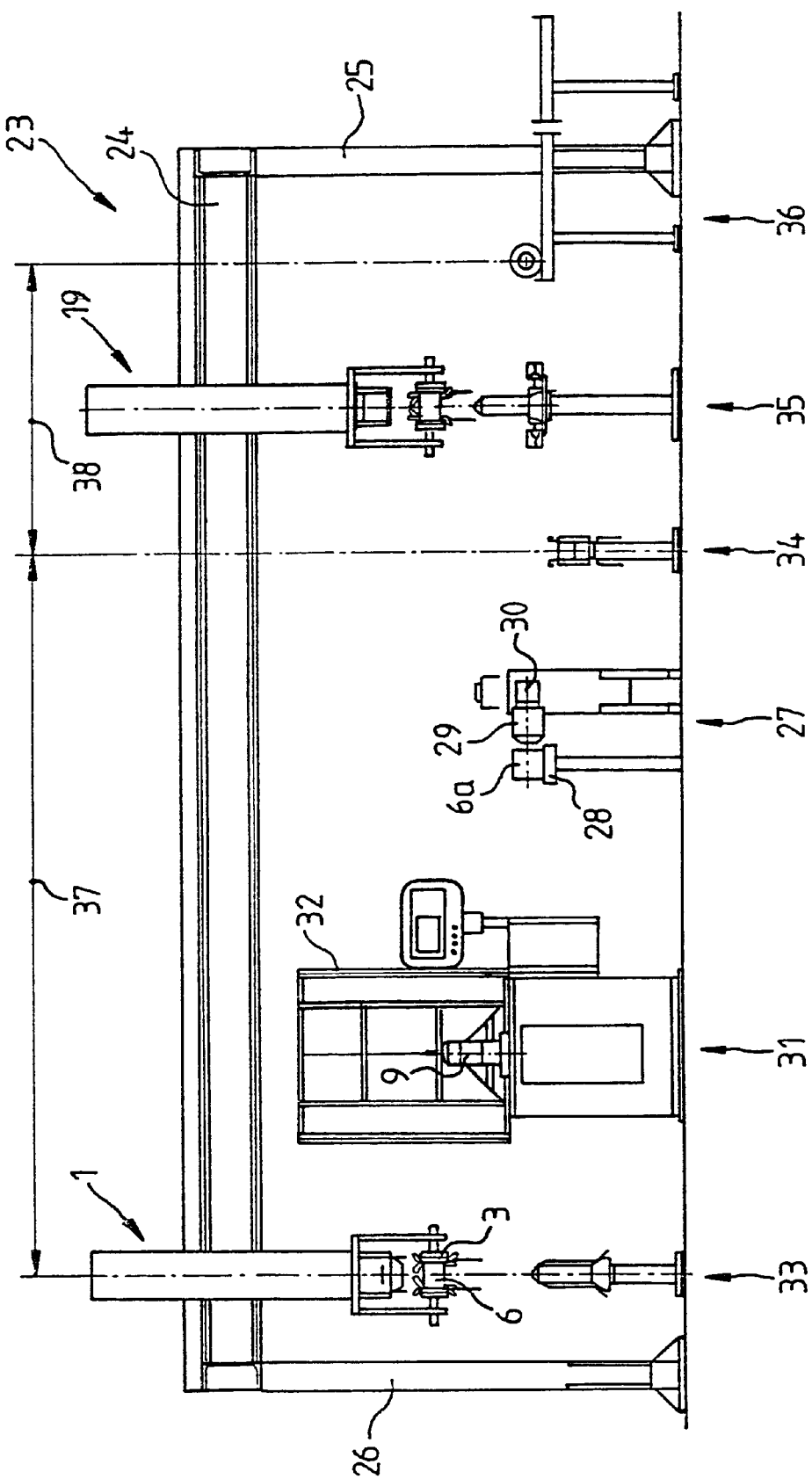
FIG. 4 shows a diagrammatic representation of a production line for fully automated or semiautomated pulling-in and forming of stator coils into stator laminated cores.

The representation in accordance with FIG. 4 shows the outlined method cycle in conjunction with the complete production line 23. Two hoisting units 1, 19 can be moved in an essentially horizontal direction on a gantry 24 which is fastened on the floor of a workshop via vertical legs 25, 26.

The hoisting unit 1 in this case picks up a stator laminated core 6 at a loading station 27 in the way described. For this purpose, the stator laminated core is firstly set down in a horizontal alignment 6a on a depositing unit 28. In this alignment, the depositing unit 28 is easier to manipulate, since the comparatively heavy stator laminated core need not be raised above the holding mandrel 29. The holding mandrel 29 is subsequently inserted by machine into the stator laminated core 6a and swiveled about the swiveling axis 30 so that the hoisting unit 1 can pick up the stator laminated core 6 in the previously described, essentially vertical alignment with its hoisting gripping device 3.

Subsequently, the hoisting unit 1 is moved to a pull-in station 31. The pull-in station 31 at the same time contains a winding unit (not represented in more detail) for winding and setting down the stator coils 7, 8 in the pull-in tool 9. A protective housing 32 which is arranged around the pull-in tool 9 during this winding operation, indicates this circumstance. The protective housing 32 is removed from the pull-in tool 9 for the purpose of pulling in the stator coils 7, 8. The pulling in is then performed in the way described with the aid of FIG. 1.

After the stator coils 7, 8 have been pulled in in the pull-in station 31, the hoisting unit 1 is moved further until it is located in the position illustrated in FIG. 4 above the intermediate forming station 33. The intermediate forming which subsequently takes place is performed in the way described with the aid of FIG. 2.

Further coil or coil groups can now be pulled in in the pull-in station 31 and, if required, be intermediately formed in the intermediate forming station 33. Upon termination of all the pull-in operations, the stator laminated core 6 is set down in a defined position at the transfer station 34. Here, it is picked up by the hoisting unit 19 which, as set forth above, likewise has a hoisting gripping device 3, and brought to the final forming station 35. There, the final forming of the stator coils is undertaken in the way described with the aid of FIG. 3. Subsequently, the stator laminated core 6 is set down at an unloading station 36.

The travel paths 37, 38 of the two hoisting gripping devices 1, 19 are thus set up in the exemplary embodiment described exactly so that no collision can take place. They render it possible for the two hoisting units 1, 19 to be moved precisely as far as the transfer station 34.

As described above, it is possible depending on what is desired for stator coils 7, 8 to be mounted semiautomatically or fully automatically in the stator laminated core 6 on a production line 23. Essential to this automation of production is the construction of the hoisting units 1, 19 in which it is possible during the fixing of the stator laminated cores 6 with the aid of displaceable processing tools 10, 12, 21 integrated in the hoisting units 1, 19 for the stator laminated cores 6 to be processed from the opposite side, that is to say from above in the exemplary embodiment, while or after the stator laminated cores 6 are or have been lowered by lowering the hoisting units 1, 19 onto lower processing tools 9, 13, 22.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for pulling-in coils into stator laminated cores, wherein the apparatus comprises:

a hoisting unit having a frame provided with a holder which is adapted to grip a stator laminated core laterally at a circumference of the core and, which is movable between at least two processing stations, a pull-in tool, which is arranged separately with respect to the hoisting unit; and a cover for fixing pull-in needles of the pull-in tool, wherein the cover is movable in relation to the pull-in tool and to the holder and wherein the cover is mounted to the frame of the movable hoisting unit same as the holder.

2. The apparatus according to claim 1, wherein said cover is moveable along a central axis of said stator laminated core held by said holder.

3. The apparatus according to claim 1, further comprising a former for forming stator coils on one side of the stator laminated core which is opposite a side for said pulling in of said coils.

4. The apparatus according to claim 1, wherein said holder is a hoisting griping device.

5. The apparatus according to claim 1, wherein said holder can be swivelled with respect to said frame of said hoisting unit.

6. The apparatus according to claim 1, wherein said hoisting unit is moveable between a loading station, a pull-in station and/or a forming station.

7. The apparatus according to claim 1, further comprising at least one additional hoisting unit with a processing tool.

8. The apparatus according to claim 7, wherein said additional hoisting unit includes a final former and wherein said additional hoisting unit is moveable to a final forming station.

9. The apparatus according to claim 1 wherein said holder is rotatable.

* * * * *